United States Patent [19]

Massie

[11] 4,255,988
[45] Mar. 17, 1981

[54] AXIAL GEAR TRAINS

[76] Inventor: Philip E. Massie, 4220 Irving Pl., Culver City, Calif. 90230

[21] Appl. No.: 568,928

[22] Filed: Apr. 17, 1975

Related U.S. Application Data

[63] Continuation of Ser. No. 358,973, May 10, 1973, abandoned.

[51] Int. Cl.³ .............................................. F16H 1/28
[52] U.S. Cl. ........................................ 74/800; 74/206; 74/199
[58] Field of Search .......................... 74/800, 206, 199

[56] References Cited

U.S. PATENT DOCUMENTS

| | | | |
|---|---|---|---|
| 3,224,286 | 12/1965 | Mori et al. .......................... | 74/206 X |
| 3,550,476 | 12/1970 | Young ..................................... | 74/640 |
| 3,640,154 | 2/1972 | Massie ..................................... | 74/800 |

FOREIGN PATENT DOCUMENTS 952789  3/1964  United Kingdom ....................... 74/800
301479  3/1972  U.S.S.R. ..................................... 74/640

Primary Examiner—Leslie Braun
Attorney, Agent, or Firm—Herzig & Walsh, Inc.

[57] ABSTRACT

An axial gear train of the type having a nutating gear mounted on a skew axle that has a gear face meshing with a fixed gear face. A nutating gear has a gear face meshing with a gear face on an output gear. The improvement resides in means positioned to hold the gear faces on the nutating gear or gears and the gear faces they mesh with together at the point of contact which rotates. The improvement in one form comprises yokes positioned at and rotating with the rotating points of contact. In another form, cluster gear assemblies are provided so arranged that opposing forces are created resisting the tendency of gear faces to push apart. Further improvements reside in particular design construction to facilitate mounting or journalling of the nutating gear or gears on the skew axle by way of a split hub construction which provides the journal for said gear or gears.

4 Claims, 17 Drawing Figures

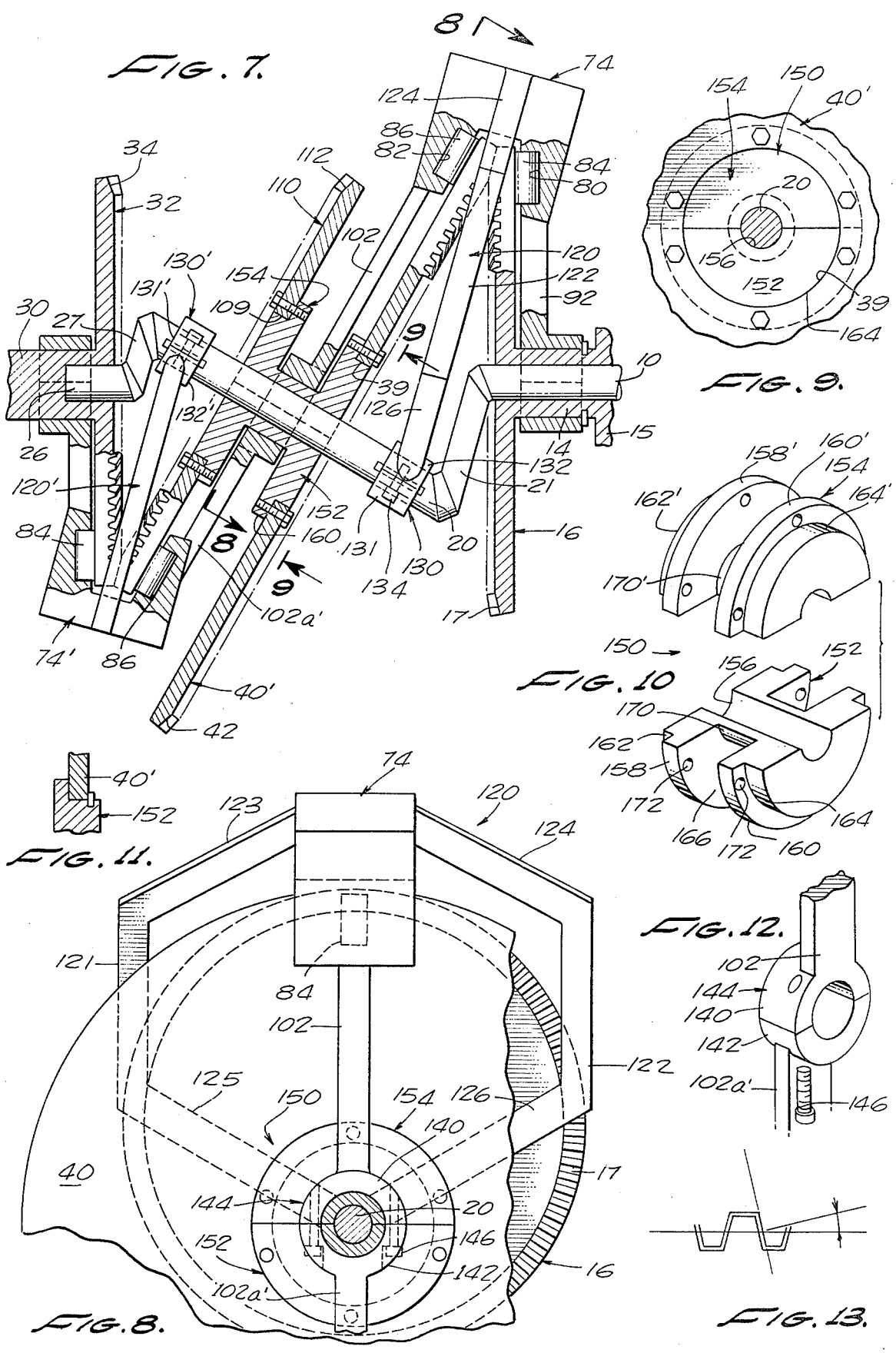

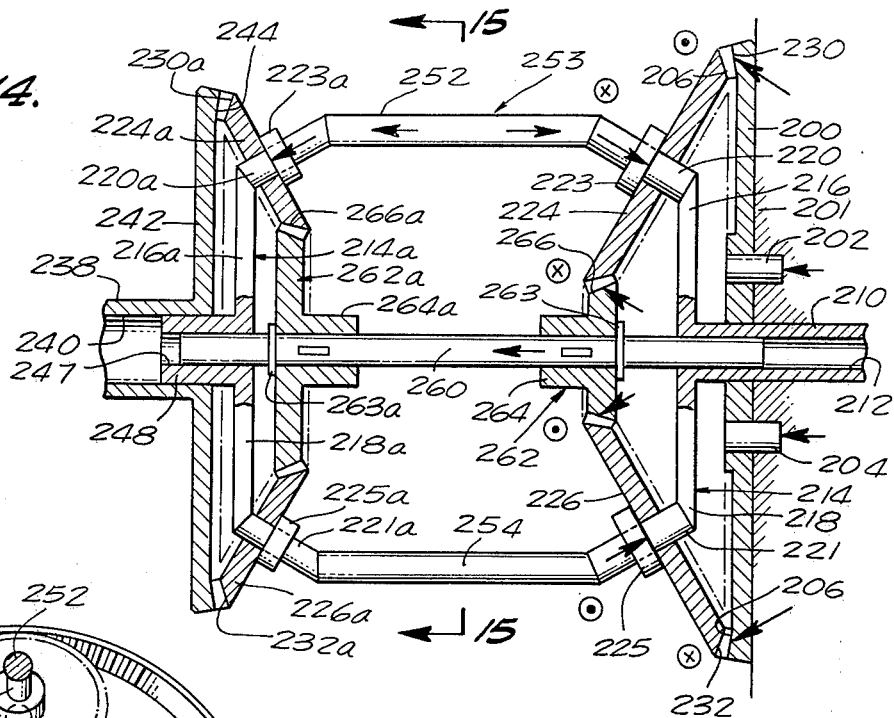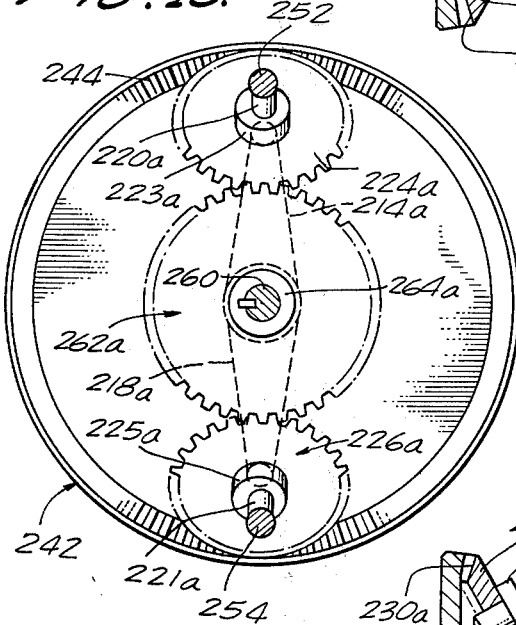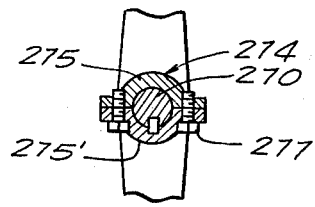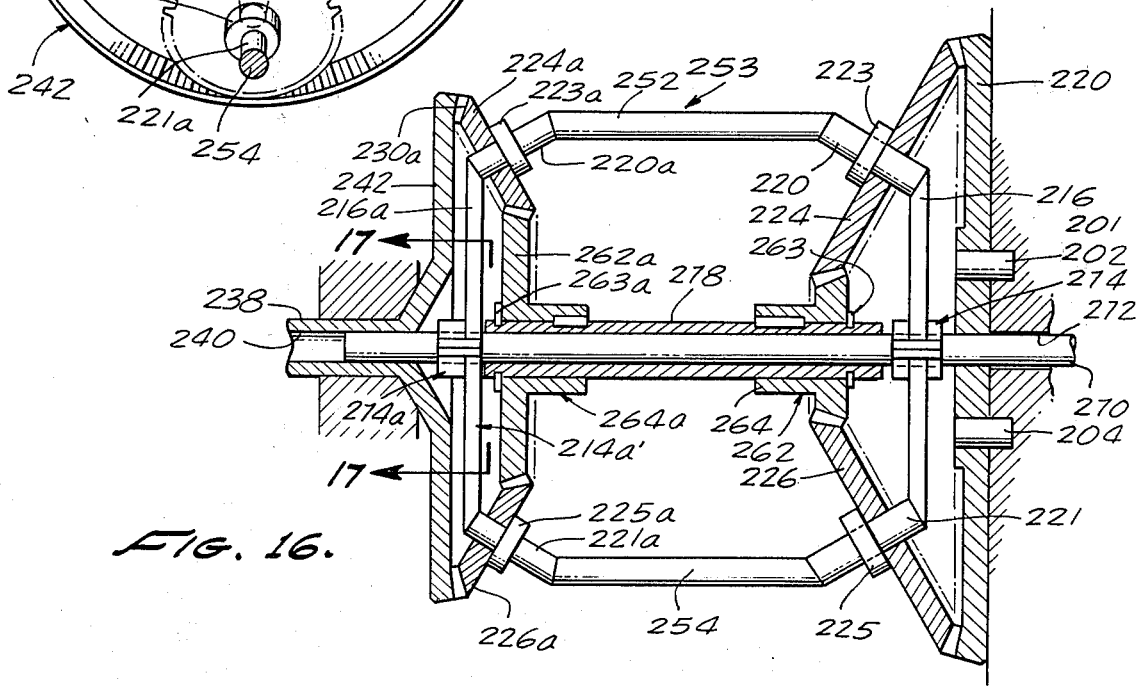

AXIAL GEAR TRAINS

This application is a continuation of Ser. No. 358,973 filed May 10, 1973, now abandoned.

SUMMARY OF THE INVENTION

The invention relates to improvements in axial gear trains which make possible speed changes between one shaft and another, particularly speed reduction. The particular axial gear train in which the improvements are made is of that type wherein a nutating gear having gear faces is mounted on a skew axle between an input and output shaft.

Various forms of the invention are disclosed in detail herein, the various forms having in common the characteristic that forces are created which resist forces tending to push the meshing teeth of the gear faces apart. In one form of the invention, it takes the form of a yoke or yokes carried at the rotating points of contact between the meshing gear faces which holds these faces together.

A nutating gear has a face which meshes with a face on a fixed input gear. A yoke is provided at the point of contact between the gear face on the nutating gear and the fixed gear face which point of contact rotates. The yoke is constructed to hold these gear faces together to prevent pressure from forcing them apart. The said yoke is mounted from the input shaft and the skew axle in a manner to rotate with the point of contact between the gear faces. The type of axial gear train in which the improvements are made are shown in U.S. Pat. Nos. 3,587,349 and 3,640,154. The driving force between the gear face on the nutating gear and the fixed gear face is such as to tend to force the gears apart. Thus, it would be necessary to make the nutating gear or the disc of this gear relatively stiff and strong, thus adding weight and cost to manufacture and still not providing a fully satisfactory answer to the pressure problem. A similar yoke is provided at the point of contact between the gear face of the nutating gear and the gear face of the output gear that it meshes with.

A primary object of the invention is to provide a solution to this problem by means of the rotating holding yokes. In one exemplary form of the invention as described in detail herein, the yoke is a V-shaped structure having rollers which engage with the nutating gear and the gear it meshes with. The rollers bear on the gear faces opposite the teeth. The rollers may be conical or cylindrical. The rollers restrain the gear faces from separating. The yoke and rollers as stated, rotate with the rotating point of contact.

In a preferred form of the invention, the holding yokes are not utilized, but on the other hand, a cluster gear or gear face assembly is utilized wherein two sets of intermeshing gears or gear faces are provided and coordinated in such a way that the forces tending to cause the gear faces in one set to push apart are balanced by reaction forces, which are forces tending to push apart the gear faces of the other set. This form of the invention embodies the difference that the nutating gears on skew axles are provided in pairs, the gears of each pair being diametrically opposed to each other and further these gears being displaced from the axis of the input and output shafts and also meshing with the gear faces on gears rotating about the axis of the input and output shafts. One of the pairs of gears has gear faces meshing with a gear face on the output gear. The two pairs of nutating gears are carried on a frame that is rotated by the input shaft resulting in forces in each pair tending to cause meshing gear faces to push apart being directed inwardly with respect to the assembly and balancing each other.

Further improvements in axial gear trains of the type referred to are provided. It is desirable to make the shaft in one piece, that is, the skew shaft with the parts constituting the input shaft and the output shaft which are axially aligned and journalled. Likewise, it is desirable to make the gears in one piece. Of course, if the bore in the nutating gear or gears is made of a size to be journalled on the skew shaft, it would not be possible to install this gear or gears on the shaft. A split hub in two semicircular parts is provided made to fit on the skew shaft. The parts of the hubs have a parting line and are securable together on the shaft. The nutating gear or gears have a relatively large center opening so that they can be assembled over the ends of the shaft and then secured to a hub which has been mounted on a skew axle. On the other hand, the nutating gear may have a relatively large center opening which is journalled directly on the part of split hub.

In the light of the foregoing, the primary object of the invention is to realize improvements in axial gear trains of the type referred to embodying one or more nutating gear faces whereby the problem of gear faces tending to push apart is overcome. A corollary object is to achieve this result by a relative simple mechanism not embodying undue weight or complexity.

A further object is to realize the said improvement by means of holding yokes which hold meshing gear faces together at the rotating points of contact.

Another object is to realize the purpose stated by way of an assembly of nutating gears comprising two pairs of nutating gears having gear faces and carried by a frame. The gears of one pair mesh with a fixed gear, and the gears of the other pair having gear faces meshing with an output driven gear in a manner whereby the forces in each pair of gears tending to cause gear faces to push apart become reaction forces resisting these same forces in the other pair.

A further object is to provide a mechanism which realizes the result as set forth in the previous object wherein pairs of nutating gears are carried on a frame rotated by the input shaft, the gears on each pair having gear faces which mesh with gears rotatable about the axis of the input and output shafts.

Another object is to provide a mechanism as in the foregoing objects wherein the last mentioned gears which rotate about the axis of the input and output shafts are carried by a tubular shaft that is journalled on the input shaft.

BRIEF DESCRIPTION OF THE DRAWINGS

Further objects and additional advantages of the invention will become apparent from the following detailed description and annexed drawings, wherein:

FIG. 7 is a view, partly in section, of a modified form of holding means for the yoke and modified hub construction for the nutating gear;

FIG. 8 is a partial view of the form of the invention shown in FIG. 7 taken along the line 8—8;

FIG. 9 is a view taken along the line 9—9 of FIG. 7;

FIG. 10 is a perspective view of a modified form of hub construction;

FIG. 11 is a detail view illustrating mounting of a gear disc on the hub;

FIG. 12 is a detail view illustrating the mounting of the yoke with respect to the nutating gear or gears and skew axle;

FIG. 13 is a view of gear teeth on a fixed gear face illustrating the resultant forces between the respective gear teeth;

FIG. 14 is a schematic sectional view of a modified form of the invention;

FIG. 15 is a sectional view taken along line 15—15 of FIG. 14;

FIG. 16 is a cross sectional view of another modified form of the invention; and FIG. 17 is a sectional view taken along line 17—17 of FIG. 16.

DESCRIPTION OF THE PREFERRED EMBODIMENTS

Figure 1:
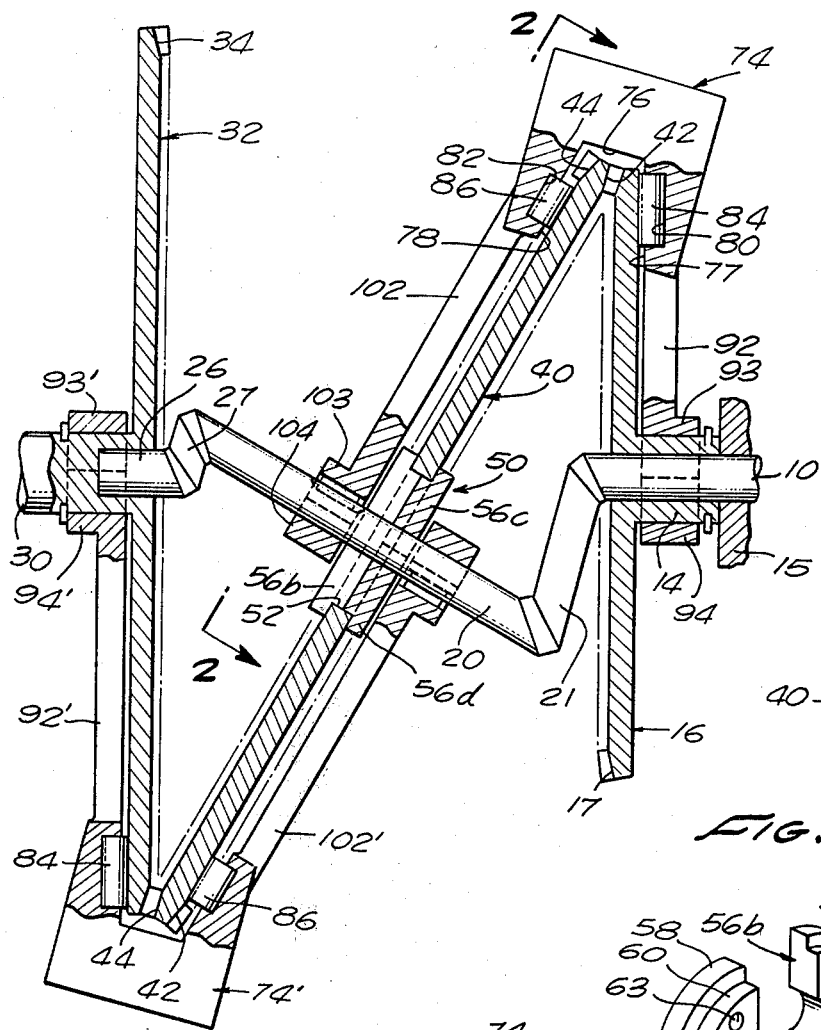
FIG. 1 is a view partly in section of a preferred form of the invention showing the holding means for the gear faces.

In FIG. 1 of the drawings, numeral 10 designates an input or drive shaft. Shaft 10 is journalled in bearing 14 which may be part of a fixed body 15 and which carries fixed gear 16 having a gear face 17.

Shaft 10 has an angular skew axle portion 20 which may be at an angle of 25° to 30°, for example, with respect to the end portion of the shaft. Axle 20 is offset from the end part of shaft 10 by offset part 21.

The other end of shaft 10 which is preferably made in one piece is designated by 26 which is connected to the skew axle part by offset part 27. End part 26 is journalled in the end part of output shaft 30 on which is output gear 32 which has a gear face 34 which will be referred to again presently.

Numeral 40 designates a nutating gear disc having gear faces on both sides as designated at 42 and 44. Gear disc 40 is journalled on a hub 50 which in turn is keyed on to skew axle 20.

Figure 4:
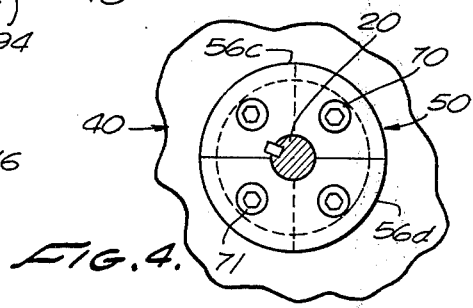
FIG. 4 is a detail view of a split mounting hub.
Figure 6:
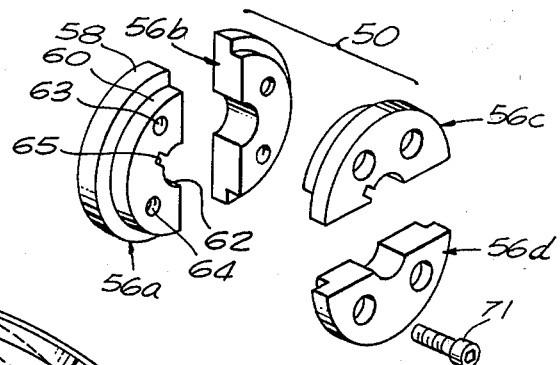
FIG. 6 is an exploded perspective view of the hub construction.
Figure 5:
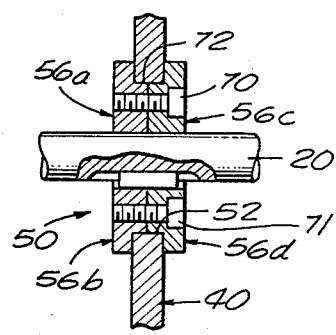
FIG. 5 is a sectional view of the hub construction.

A preferred form of construction of hub 50 is shown in FIGS. 4, 5, and 6. The nutating gear 40 has a relatively large center opening designated at 52. The shaft, including the skew axle part and its two end parts is preferably made in one piece. Hub 50 is constructed in a manner which will be described in order to accommodate assembly of nutating gear 40 on to the shaft. Hub 50 comprises four semicircular parts designated at 56a, 56b, 56c, and 56d. These parts are alike, except as referred to presently. Part 56a has two diameters, one designated at 58 which is larger and the other at 60. At its center, it has a half bore designated at 62. Part 56a has axial bores 63 and 64 and keyway 65 as shown. Parts 56b, 56c, and 56d are like part 56a so that they need not be described in detail. The four parts are assembled as shown in FIGS. 4 and 5 by way of being attached together by bolts or screws as designated at 70 and 71 so that when they are attached together, an annular groove as designated at 72 is formed between them. They can be assembled on to the skew axle 20 as illustrated in FIGS. 4 and 5. Nutating gear 40 has center opening 52 and can be assembled on to annular groove 72 at the time of assembly together of the parts 56a through 56d. The hub can be journalled on the shaft. Then, nutating gear 40 is keyed to the hub; or on the other hand, the hub can be keyed to skew shaft 20 with nutating gear 40 journalling on the hub. As may be observed, parts 56a and 56b form one half of the hub, split along a diameter, and parts 56c and 56d form the other half of the hub part along a diameter which is at right angles to the split in the other half.

Figure 2:
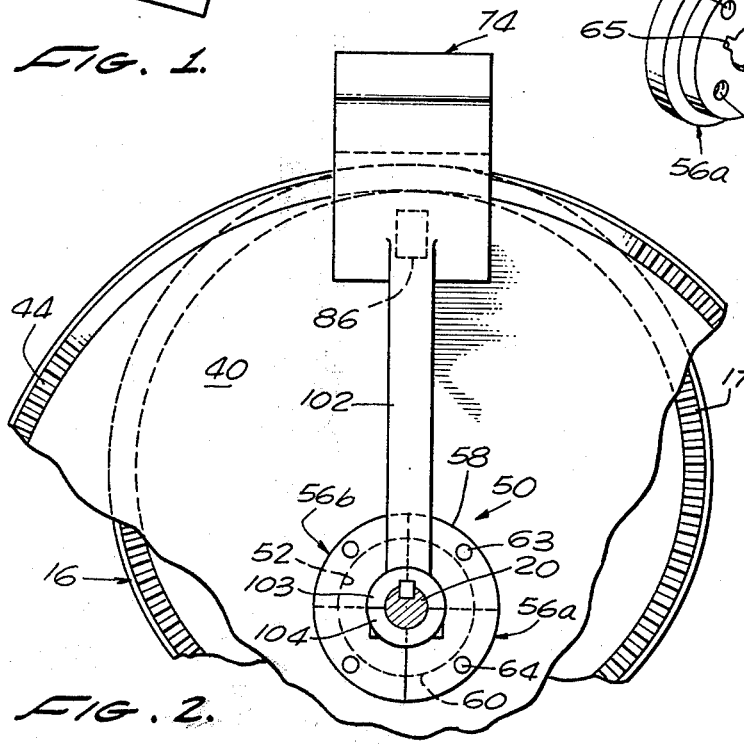
FIG. 2 is a view taken along the line 2—2 of FIG. 1.
Figure 3:
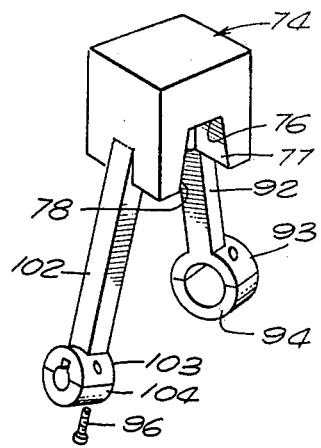
FIG. 3 is a detail view of the yoke which holds the rollers for holding the gear faces together.

FIGS. 1, 2, and 3 illustrate the holding yoke for holding gear faces together. As will be understood, gear faces 42 and 17 mesh with each other at a rotating point of contact. Gear faces 34 and 44 mesh with each other at a diametrically opposed position which is also a rotating point of contact. Holding means are provided to hold these meshing gear faces together at each of the rotating points of contact. The holding means rotates with the points of contact. One form of holding means is shown in FIGS. 1 to 6. Numeral 74 designates a block having an opening 76 with diverging side walls 77 and 78. These side walls have recesses 80 and 82 formed in them. Mounted in these recesses are rotatable rollers 84 and 86, these rollers being preferably tapered to accommodate to the difference in linear speeds at different distances from the center of rotation. The opening or recess 76 and its side walls are formed at an angle corresponding to the angle between gears 16 and 40 so that rollers 84 and 86 engage the surfaces of these gear discs as shown so that their faces 17 and 42 are held in meshing relationship, resisting the forces tending to separate these faces.

The block is supported in a manner so as to rotate with the rotating point of contact as described. Numeral 92 designates an arm, the outer end of which is integral with block 74 and at the inner end of which is a split hub formed in two halves 93 and 94. This hub is mounted on hub 14 of gear disc 16. Because the hub is formed of two halves, it is possible to mount it on hub 14, the halves being held together by screws, such as 96. Numeral 102 designates another arm, one end of which is integral with block 74 and at the inner end of which is another split hub formed in two halves 103 and 104. This hub is mounted on axle 20, assembly being made possible by reason of the hub being split in two halves and held together by screws.

Numeral 74' designates the other holding means. It is supported by corresponding arms 92' and 102'. These parts are like the corresponding ones already described. Therefore, they need not be described in detail, the only difference being in the length of arms 92' and 102'. Arm 92' has a similar hub at the end formed in two halves 93' and 94, each half being journalled on output shaft 30.

From the foregoing, it will be observed that the holding means as described is supported at the positions of the two rotating points of contact from points aligned with the axis of the input and output shafts and from the skew axle. The supporting arms which engage the skew axle are keyed thereto; whereby, the supporting means rotates with the rotating point of contact. In this manner, the meshing gear faces are held together, resisting the forces which tend to separate them.

FIGS. 7 through 12 show a modified form of the invention wherein the manner of supporting the holding means for holding the gear faces together is modified. Also, there are two nutating gears rather than one, and the manner of support and journalling of these gears is modified. Parts which are the same as in the previous embodiment are identified by the same reference numerals. Accordingly, these parts need not be described again. In this form of the invention, gear 40' has only one gear face 42 and it is mounted on skew axle 20 in a different way as will be described. A second gear 110 is provided having gear face 112 which meshes with gear face 34 of output gear 32.

Holding means 74 and 74' are supported and held as in the previous embodiment. However, additional support and stiffening means are provided for holding members 74 and 74'. Numeral 120 designates an hexagonal supporting frame having parallel side members 121 and 122, members 123 and 124 between the side members, and supporting block 74. The frame also has members 125 and 126 between the opposite ends of members 121 and 122 and split hub 130. Split hub 130 is formed in two halves 131 and 132. Parts 125 and 126 of frame 120 are integral with half 132 of split hub 130, the halves being held together by screws as designated at 134. The ends of frame parts 123 and 124 are integral with one side of block 74 as shown. Split hub 130 embodies a key and it is keyed to the skew axle 20.

Numeral 120' designates a second frame of similar shape having frame parts which are integral with the other block 74' and corresponding frame parts which are integral with one of the split halves 132' of another split hub 130' which is also on skew axle 20 and keyed thereto.

Arms 102 and 102a' extend inwardly to the two halves 140 and 142 of split hub 144 as shown in detail in FIG. 12, the two halves being held together by screws such as shown at 146. Split hub 144 is journalled on a hub which supports nutating gears 40' and 110 as will be described.

The hub referred to is designated generally at 150 in FIG. 10 and as shown in cross section in FIG. 7. It is formed in two halves 152 and 154 which are alike. Half 152 is semicircular having a half bore 156. It has spaced flange parts 158 and 160 adjacent to which are integral disc parts 162 and 164 of smaller diameter. Accordingly, there is an annular space 166 between flanges 158 and 160, the bottom of which is hub part 170. Flanges 158 and 160 have bolt holes therein such as shown at 172 for purposes of attaching nutating gear discs 40' and 110 to these flanges.

Hub half 154 is like half 152 and therefore need not be described in detail. These parts are mountable on skew axle 20 in a position as shown in FIG. 7. Half bore 156 becomes a bore which is journalled on skew axle 20. The half discs 164—164' forms a disc which fits into bore 39 in gear disc 40' which is then bolted to flange 160—160' shown in FIG. 7.

The disc formed by half discs 162—162' forms a disc which fits into bore or hole 109 in nutating gear disc 110 which is then bolted to flange 158—158' as may be seen in FIG. 7. Thus, hub 152-154 is journalled on skew axle 20, and hub 144 is journalled on hub 170—170', forming the center part of hub 152-154. Holding means 74—74' rotates with the rotating point of contact by virtue of split hubs 130 and 130' being keyed to skew axle 20.

From the foregoing, it can be observed that in addition to the holding means and supports therefor for the respective gear faces, additional supporting and stiffening members are provided by way of frames 120 and 120' which provides complete rigidity and stability for the assembly. The operation otherwise is like that of the previous embodiment.

FIGS. 14 and 15 show modified forms of the invention. These modifications are for purposes of realizing reduction in bending loads to which the nutating gear face disc or discs are subjected. In the construction shown in FIG. 1, the nutating gear has two forces on it due to the wedging action of the gear teeth tending to separate each tooth engagement. Each of the forces is in a direction that causes a bending load on the gear disc in the same rotational direction. It is desirable to minimize this effect.

In FIG. 14, numeral 200 designates a fixed gear fixedly supported by way of stems 202 and 204 and having a gear face 206. The input shaft is designated at 210, the shaft being tubular, having a bore 212 and having on it a rotor 214 having two spokes 216 and 218. At the end of these spokes, there are skew axles 220 and 221, on which are gear discs 224 and 226. These gear discs have gear faces 230 and 232 which mesh with gear face 206. As may be seen, the plane of these gears is at an angle to the axis of shaft 210. In operation, these gears planetate or orbit around input shaft 210, as will be described.

Numeral 238 designates the output shaft which is also tubular, having a bore 240 and having on it output gear 242 having a gear face 244.

Journalled in bore 240 in output shaft 238 is a hub 248 of rotor 214a which is similar to and symmetrical with respect to rotor 214. It has similar spokes 216a and 218a at the ends of which are skew axles 220a and 221a. Carried on these axles are gear discs 224a and 226a, having gear faces 230a and 232a.

Numeral 252 designates a frame member extending between the skew axles 220 and 220a parallel to the axis of the input and output shafts. Numeral 254 designates a similar frame member extending between skew axles 221 and 221a. From the foregoing it will be seen that the spokes of rotors 214 and 214a the skew axles 220, 220a, 221, and 221a and members 252 and 254 form a rectilinear frame which is rotated by the input shaft 210 as will be described more in detail presently. The frame as a whole is identified by numeral 253. Each of the gear discs 224, 226, 224a, and 226a has adjacent to it a collar as designated at 223, 223a, 225 and 225a.

Numeral 260 designates a shaft which is coaxial with the input and output shafts. One end of it is journalled in bore 212 of input shaft 210 and its other end is journalled in bore 247 of hub 248. Keyed on this shaft is gear disc 262 having a hub 264 and a gear face 266 which meshes with gear face 230 of gear disc 224. Numeral 262a designates another gear disc keyed on to shaft 260 having a hub 264a and having a gear face 266a which meshes with gear face 230a of gear disc 224a. In the form of the invention shown, gear disc 262a is larger than gear disc 262. Shaft 260 can rotate in its journals, along with gears 262 and 262a mounted on it. Gears 262 and 262a are axially restrained by collars 263 and 263a so that the axial forces oppose each other.

It will be observed that FIG. 14 shows two pairs of gears on skew axles which can planetate or orbit around the transverse center axis. The effect of each pair is the same, realizing a gear ratio, and output rotation of the output shaft in one direction. (A circle with a dot denotes an arrowhead, and a circle with a cross denotes an arrowtail in indicating rotation with respect to the plane of the paper). As may be seen, the rectilinear frame carrying the oribiting gears is rotatable as an assembly with respect to fixed gear face 200, the rotation being transmitted to the output gear 242. The gear train as described achieves speed ratios and/or direction of rotation as in the previous embodiments. The gears of each pair assist each other in transmission of rotation at the particular ratio to the output gear. The manner in which the bending loads on the face gears is reduced will be described presently.

FIGS. 16 and 17 show a modification of the form of the invention of FIGS. 14 and 15. Parts which are the same as in the modifications of FIGS. 14 and 15 are identified by the same reference numerals and need not be described again. Numeral 270 designates a through shaft which is journalled in a bore 272 in the support, its other end being journalled in bore 240 of output shaft 238. Rotors 214' and 214a' have split hubs as designated at 274 and 247a for mounting on shaft 270 and the rectilinear frame rotates with shaft 270. FIG. 17 shows hub 274 having halves 275 and 275' held together by screws 277. Gears 262 and 262a are keyed on sleeve or tubular shaft 278 in which shaft 270 is telescoped and may be journalled on shaft 278 or keyed to it. In this form of the invention, the input drives both rotors 214' and 214a which avoids any twist or torsion in frame 252.

The forms of the invention as shown in FIGS. 14 through 17 realize a reduction of bending loads on the face gear discs. In FIGS. 14 and 16 the forces acting on the gear faces tending to unmesh the gear faces react against support member 201 or on the other hand, it may be said that support member produces a reacting force against fixed gear 200. This reaction force is transmitted as a force acting against gear faces 230 and 232. This results in a balance of forces on the fixed input gear. In FIG. 14, gear 262 is held to the left by shaft 260 and the leftward axial force in it. This produces reaction forces on faces 230 and 232 of gears 224 and 226 in response to the unmeshing forces. The result is a balance of forces on gear 262. The forces acting on gear face 230 produce a balance of forces on gear 224, and the forces acting on gear face 232 produce a balance of force on gear 226. The same analysis applies to gears 224a, 226a, 216a, and 242.

Referring to FIG. 16, collar 223 on shaft 220 will supply reaction force along the axis of shaft 220 on gear 224 in opposition to forces of gear faces 230 against gear faces 206 and 266. This is transmitted through shaft 252 to collar 223a where a reaction force is applied to gear 224a by the collar on shaft 220a. The forces on collars 223 and 223a are in opposite directions and balanced through shaft 252.

In FIG. 16, it can be seen that the reaction on gears 262 and 262a results in equal and opposite axial forces in shaft 270. These are opposite in the shaft.

From the foregoing, it can be seen that the system shown balances the bending forces on each gear disc with a suitable reaction point for the force at the hub of the gear. However, this does not indicate the bending force of a gear disc. It puts two bending forces on opposite diametrical points of the gear disc that are in the same direction, thus reducing the force tending to rotate the plane of the gear about the hub. Further, the two forces are each approximately half the single force as in FIG. 14.

Two additional advantages accrue. The rotational forces on each gear are now balanced. The circumferential force at the contact points have forces perpendicular to the plane of the paper which are opposite. This reduces the bending effect on the attached point 201. The same effect is present at each gear.

The second advantage is the rotational mass balance of the system. FIG. 16 shows that there is mass balance about the main axis of rotation. This reduces any tendency to vibration without the addition of auxiliary mass balances.

All the speed and direction changes of the previous embodiments and patents are present in the systems of FIGS. 14 through 17. Use of the roller blocks at points of contact is possible to further reduce the tooth separation tendency. In this embodiment, the rotating mass balance and rotational forces balance are still important and significant, especially in high speed gear systems.

What is claimed is:

1. In an axial gear train of the type having a first fixed bevel gear member provided with a first fixed gear face, a second bevel gear member having at least one gear face in mesh with said first gear face and means mounting the second gear member for nutation about the axis of the first gear member, said means including a shaft rotatable about said axis, an offset part fixed to said shaft and having a skew axle fixed thereon extending oblique to said axis and upon which said second gear member is rotatable, the improvement comprising; said second gear member having a central opening therethrough of a size to pass said shaft, offset part and skew axle therethrough, and a plurality of complementary separate parts removably mounted in said opening with each part partially embracing said skew axle and together defining a hub journalling said second gear member on said skew axle.

2. A gear train as defined in claim 1, wherein each of said separate parts is in the form of a semi-circular bearing member, each having a central portion extending across the radial space between said opening and said skew axle and a radial flange bearing against a face of said second gear member.

3. A gear train as in claim 1, wherein said complementary parts are semi-circular.

4. A gear train as in claim 1, wherein said mounting comprises at least one stepped disc having a central part of smaller diameter and formed in sections configurated to be assembled together so that the parts of smaller diameter form a bearing adapted for journalling the member having the second gear face thereon and being configurated to form a center opening to fit on to the skew part of the shaft.

* * * * *